(12) United States Patent
Bridgelall et al.

(10) Patent No.: US 7,075,437 B2
(45) Date of Patent: Jul. 11, 2006

(54) RFID RELAY DEVICE AND METHODS FOR RELAYING AND RFID SIGNAL

(75) Inventors: Raj Bridgelall, Mount Sinai, NY (US); Mark Duron, Patchogue, NY (US); Richard T. Knadle, Jr., Dix Hills, NY (US); Hal Charych, E. Setauket, NY (US); Avi Nudelman, Dix Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 6 days.

(21) Appl. No.: 10/803,191

(22) Filed: Mar. 16, 2004

(65) Prior Publication Data

US 2004/0217867 A1    Nov. 4, 2004

Related U.S. Application Data

(63) Continuation-in-part of application No. 10/341,849, filed on Jan. 13, 2003.

(60) Provisional application No. 60/473,095, filed on May 23, 2003.

(51) Int. Cl.
*G08B 13/14*    (2006.01)

(52) U.S. Cl. .............................. 340/572.1; 340/572.7; 343/745

(58) Field of Classification Search .. 340/572.1–572.9; 343/745, 751, 764, 822
See application file for complete search history.

(56) References Cited

U.S. PATENT DOCUMENTS

| | | | | |
|---|---|---|---|---|
| 5,103,235 | A * | 4/1992 | Clemens ..................... | 343/742 |
| 5,825,291 | A * | 10/1998 | Platt et al. ................ | 340/572.7 |
| 6,107,920 | A * | 8/2000 | Eberhardt et al. ....... | 340/572.7 |
| 6,147,605 | A * | 11/2000 | Vega et al. ............... | 340/572.7 |
| 6,147,606 | A * | 11/2000 | Duan ....................... | 340/572.7 |
| 6,870,460 | B1 * | 3/2005 | Turner et al. ............. | 340/10.1 |
| 2002/0071399 | A1 * | 6/2002 | Smith ........................ | 370/278 |

* cited by examiner

*Primary Examiner*—Phung T. Nguyen
(74) *Attorney, Agent, or Firm*—Ingrassia Fisher & Lorenz

(57) ABSTRACT

An RFID relay device for an RFID transponder and methods are provided for relaying an RFID signal. The RFID relay device comprises at least two antenna and a transmission line coupling the at least two antenna. In addition to the two antenna and the transmission line, the RFID relay device comprises an impedance adjusting circuit coupled to the transmission line and configured for coupling to the RFID transponder.

50 Claims, 6 Drawing Sheets

RFID RELAY DEVICE AND METHODS FOR RELAYING AND RFID SIGNAL

CROSS-REFERENCES TO RELATED APPLICATIONS

This is a continuation-in-part of U.S. application Ser. No. 10/341,849, filed Jan. 13, 2003 and this application claims the benefit of U.S. Provisional Application No. 60/473,095, filed May 23, 2003

TECHNICAL FIELD

The present invention generally relates to Radio Frequency Identification (RFID), and more particularly relates to a RFID relay device and methods for relaying an RFID signal.

BACKGROUND

It is currently known to use one or more RFID tags, which are also referred to as RFID transponders, associated with one or more objects (e.g., containers, packages, platforms, and the like) for purposes of providing information about the one or more objects. Such RFID tags can provide a RFID interrogator, which is also referred to as a RFID reader, with data that can directly or indirectly provide the information about the object(s). The information about the object(s) may be stored and retrieved using any number of techniques and data formats (e.g., digital form), such as part of the RFID response code or alternately maintained in a data base external to the RFID interrogator with a correlation to the RFID identification sent by the RFID tag in response to an interrogation signal.

FIG. 1 illustrates multiple objects, which in this example are containers 20, having a RFID tag 22 in accordance with the prior art. The containers 20 are stacked and/or can be arranged in any number of configurations or arrangements. For example, the containers 20 can be arranged for warehouse storage or arranged on a pallet for storage or shipment. In connection with obtaining the information about the containers 20 or locating one or more of the containers 20, it is possible to use an RFID interrogator (not shown) to interrogate the RFID tags 22. However, depending on the contents of the containers 20 and the arrangement or configuration of the containers 20, the ability to interrogate the RFID tags 22 at locations other than the exterior or periphery of the stacked arrangement can be less than optimal with containers 20 at least partially obstructing and/or at least partially interfering with a interrogation signal emitted by the RF interrogator and/or interfering with a response signal emitted by the RFID tags 22.

Accordingly, it is desirable to provide a RFID relay device that minimizes interference and/or obstructions to interrogation signals and/or response signals and also improves deficiencies of RFID tags that are not described directly or indirectly. In addition, it is desirable to provide methods of relaying a RFID signal that minimizes interference and/or obstructions to RFID signals and also improves deficiencies of RFID tags that are not described directly or indirectly. Furthermore, other desirable features and characteristics of the present invention will become apparent from the subsequent detailed description and the appended claims, taken in conjunction with the accompanying drawings and the foregoing technical field and background.

BRIEF SUMMARY

A RFID relay device for a RFID transponder is provided in accordance with an exemplary embodiment of the present invention. The RFID device comprises at least two antennas with a transmission media coupling the two antennas. The RFID device also comprises an impedance adjusting circuit coupled to the transmission media and the RFID transponder.

A RFID object having an RFID transponder is also provided in accordance with an exemplary embodiment of the present invention that at least partially incorporates the RFID relay device. The RFID object comprises one antenna at one location of the RFID object and another antenna at another location of the RFID object. The RFID object also comprises a transmission line coupling the two antennas and an impedance adjusting circuit coupling the RFID transponder and the transmission line.

In addition to the RFID device and the object at least partially incorporating the RFID device, a method of relaying a RFID signal is provided in accordance with an exemplary embodiment of the present invention. The method comprises the steps of receiving the RFID signal at a first antenna and transmitting the RFID signal from the first antenna to a second antenna. The method also comprises the steps of exhibiting a first impedance during the transmitting the RFID signal from the first antenna to the second antenna if the RFID signal has a first power and exhibiting a second impedance during the transmitting the RFID signal from the first antenna to the second antenna if RFID signal has a second power other than the first power.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
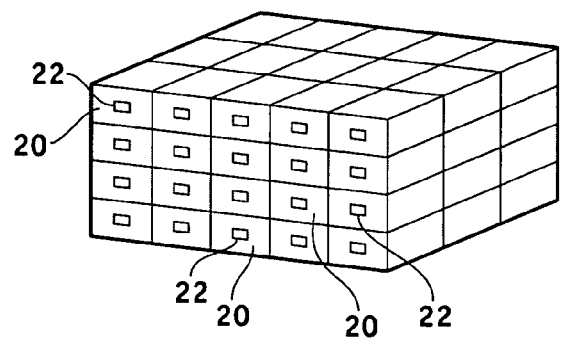
FIG. 1 illustrates an arrangement of objects with a RFID tags in accordance with the prior art.
Figure 2:
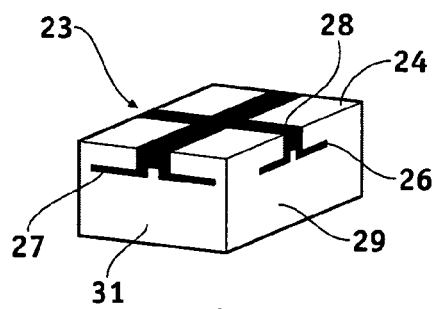
FIG. 2 illustrates an object having a RFID relay device in accordance with an exemplary embodiment of the present invention.

Referring to FIG. 2, there is schematically illustrated a container 24 having a RFID relay device 23 for a RFID transponder that is configured to relay RFID signals according to an exemplary embodiment of the present invention. The container 24 in this illustrative example is fabricated by folding fiberboard parts from a blank 30 shown in FIG. 3 as well known to those of ordinary skill in the art. However, the container 24 can be fabricated with any number of techniques from any number or materials or combinations or materials and can be any number of objects (e.g., packages, platforms, pallets, bottles, and the like).

Figure 3:
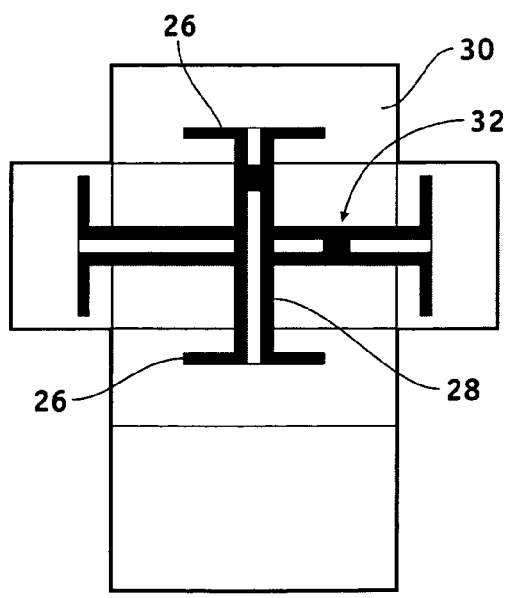
FIG. 3 illustrates another view of the object having the RFID relay device of FIG. 2.

The RFID relay device 23 includes, but is not limited to, at least two antennas (26,27) positioned at different locations. For example, the at least two antennas (26,27) can be positioned at the sidewalls (29,31) of container 24 with a transmission line 28 coupling the antennas (26,27). In the exemplary embodiment illustrated in FIG. 2 and FIG. 3, the RFID relay device 23 comprises at least two dipole antennas (26,27) and a balanced transmission line 28 at least partially printed on the exterior of the container 24 or comprise the at least two dipole antennas (26,27) formed at least partially on an insert placed that can be placed within the container 24 or attached to an exterior portion of the container 24. While the exemplary embodiments utilize dipole antennas in the RFID relay device 23, those skilled in the art will recognize that other arrangements, such as loop antennas, spiral antennas and the like may be used in accordance with the present invention. In addition, antennas in addition to the at least two antennas (26,27) can be utilized in accordance with the present invention (e.g., a third antenna, fourth antenna, . . . , Nth antenna, where N is an integer greater than four (4)). Furthermore, the two or more antennas can be coupled with the transmission line 28 or other transmission lines (e.g., a second transmission line, third transmission line . . . , M transmission line, where M is an integer greater than three (3)). Moreover, the transmission line 28 and antennas (26,27) may be formed of a common resonant structure acting as both antennas and transmission line. The RFID tags 32 as shown in FIG. 3 are preferably arranged to receive signals and are coupled to the transmission line 28 or one of the dipole antennas (26,27).

Figure 4:
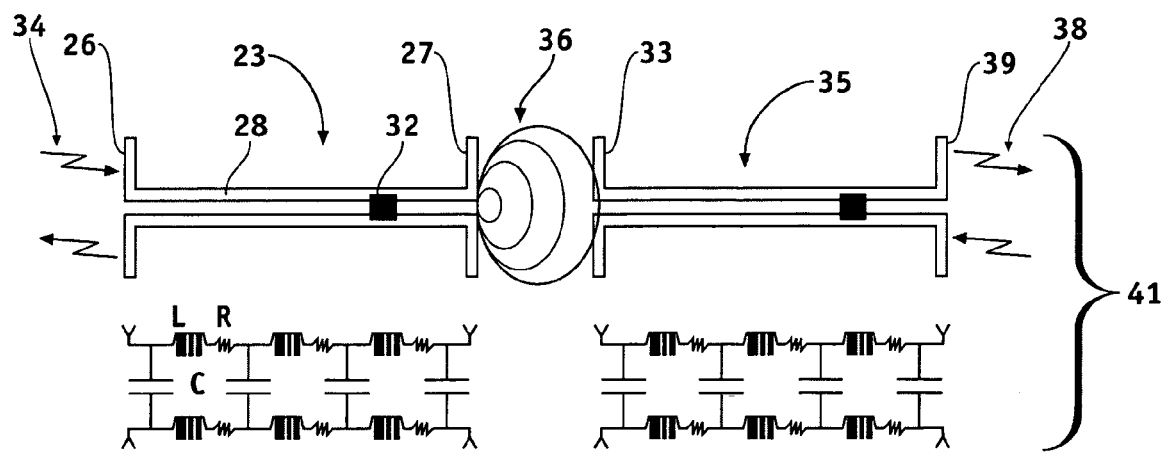
FIG. 4 is an equivalent circuit of at least a portion of the RF relay device of FIG. 2.

Referring to FIG. 4, an exemplary diagram/corresponding exemplary equivalent circuit 41 are provided for the RFID relay device 23 of FIG. 2 and FIG. 3 and other subsequently described relay devices. At least one signal 34 is received by antenna 26 and transmitted by transmission line 28 to at least the other antenna 27 positioned at a location other than the location of the antenna 26 receiving the signal 34 (e.g., on two different sidewalls of the container) and the signal 23 is also preferably transmitted to an RFID tag 32. The signal 36, which is preferably a near field signal, is radiated from the other antenna 27 and thereafter can be received by an antenna 33 on another container in proximity to the container having the antenna 27. The signal 36 can be likewise relayed with another RFID relay device 35 that produces another signal 38 at another antenna 39 for relay to other containers or for reception by an RFID interrogator (not shown). In this manner, RFID interrogation signals or RFID response signals may be relayed through or from objects located within a stack or other arrangement of containers with reduced interference from the containers or contents of the containers (e.g., metallic cans or plastic containers filled with solids or fluids that either reflect, absorb or otherwise interact with signals in the UHF or microwave band). It should be understood that the antennas (26,27,33,36,39) can be configured to act as both receiving and transmitting antennas. FIG. 4 further illustrates the equivalent circuit for the conductive structures.

Figure 5:
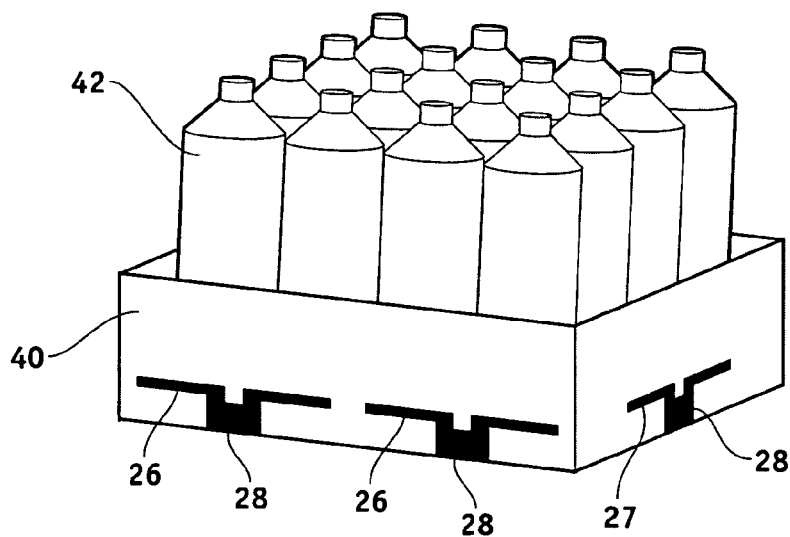
FIG. 5 is an illustration of an object having the RFID relay device that is configured as a container that holds beverage bottles in accordance with an exemplary embodiment of the present invention.
Figure 6:
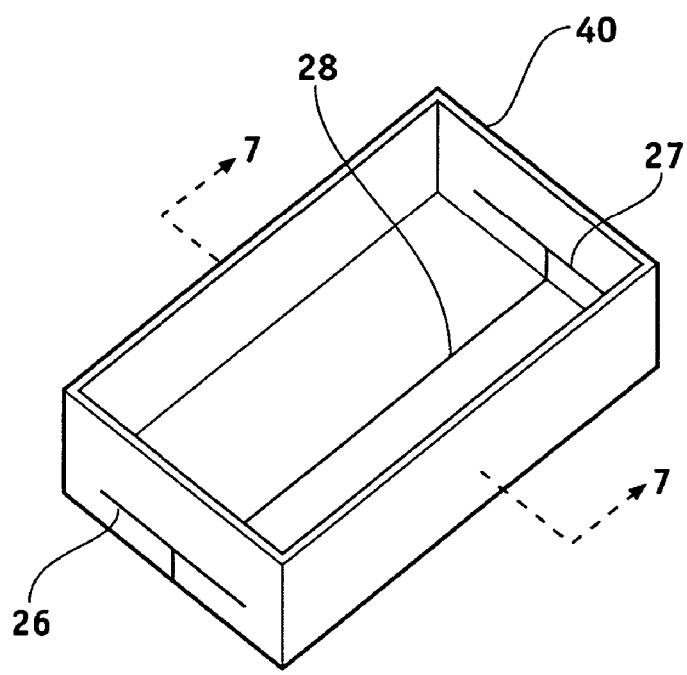
FIG. 6 is a simplified prospective view of the object of FIG. 5 having the RFID relay device without the beverage bottles.
Figure 7:
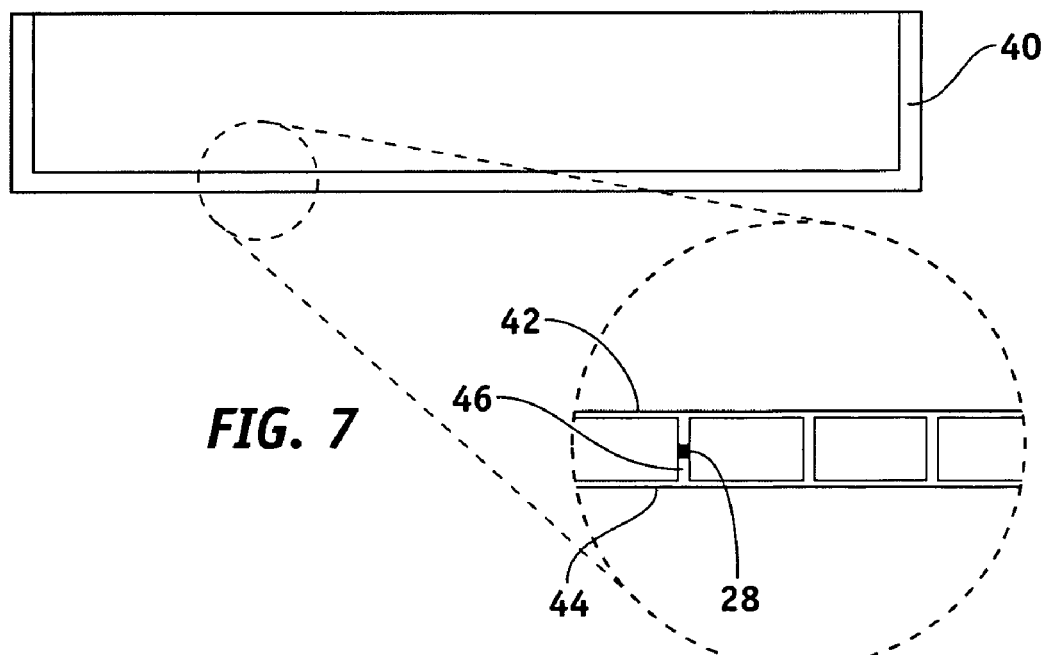
FIG. 7 is a cross-sectional view of the container of FIG. 6 taken along lines 7—7.

Referring to FIG. 5, FIG. 6, and FIG. 7, a container 40 having a RFID relay device is shown in accordance with a second exemplary embodiment of the present invention that can be re-useable and in this illustrative example is adapted to hold bottles 42 of fluid (e.g., beverages). However, the container 40 can be adapted to hold any number of objects in accordance with the present invention. The container 40 is preferably made of dielectric material, such as plastic, and includes four (4) sidewalls and a bottom. The antennas (26,27) are arranged on the side walls and connected to antennas (26,27) on other side walls with transmission line 28 for relaying RFID tag and RFID response signals to and/or from bottles 42 located within the container 40. The antennas (26,27) as shown in the simplified drawings of FIG. 6, are located on opposite sidewalls of container 40 and for simplicity, the drawing of FIG. 5 shows only the antenna 26 on one of the end sidewalls other than the opposite sidewalls of the container 40.

Referring to FIG. 7, a cross-section of the bottom wall of the container 40 provides an illustrative example in which the wall of the container 40 is made from upper wall 42 and lower wall 44, which are interconnected by ribs 46 and formed of molded plastic. Ribs 46 can run in the longitudinal direction of the container 40 or may be an egg crate structure, including ribs that run in both directions as known to those of ordinary skill in the art. The transmission line 28 is molded within a longitudinal rib 46 of the container 40 or alternately, the transmission line 28 may run in the hollow space between the inner wall 42 and the outer wall 44 of container 40.

Figure 8:
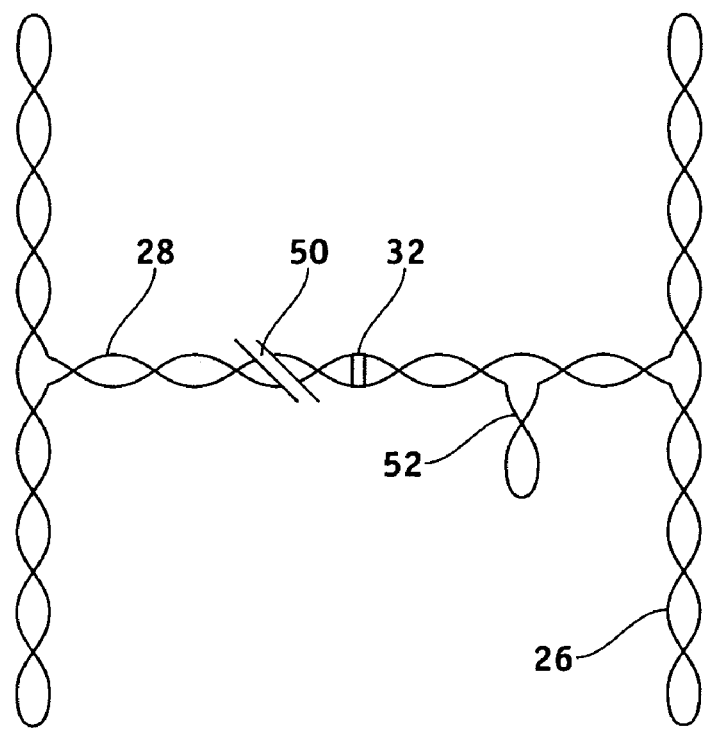
FIG. 8 is an illustration of a RFID relay device in accordance with yet another exemplary embodiment of the present invention.

FIG. 8 presents the relay conductive structure according to another exemplary embodiment of the present invention. In this exemplary embodiment, the transmission line 28 and dipoles 26 are formed of twisted pair of wires. The length of the transmission line 28 is shown as being adjustable by break 50 such that the transmission line can have a length corresponding to the length of the container (not shown). The twisted pair of wires forming the transmission line 28 preferably has a relatively low loss and can be made to resonate between the antennas (26,27). To achieve the proper resonance with the variable length transmission line 28, a tuning structure 52 may be provided in accordance with an exemplary embodiment of the present invention, which is shown as an additional pair of twisted wires connected to the transmission line 28. An RFID tag 32 may be connected directly to the twisted pair as shown in FIG. 8 or indirectly connected to the twisted pair.

Figure 9:
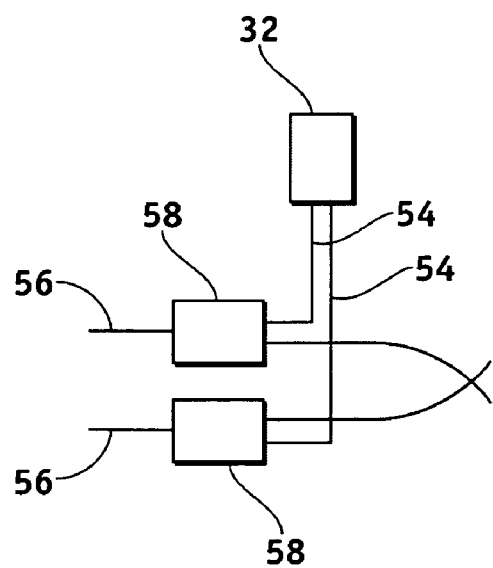
FIG. 9 is a diagram illustrating an exemplary arrangement for connecting an RFID transponder (i.e., RFID tag) to the RFID relay device of FIG. 8 in accordance with an exemplary embodiment of the present invention.

Preferably, the RFID tag 32 has less than complete coupling of signals from the RFID relay device so that signals are relayed from the receiving antenna 26 at one end of the package to be radiated by the transmission antenna 27. Experimentation has shown that the signal coupled to the RFID tag 32 should be coupled at a level of approximately −7 db. However, the signal can be coupled to the RFID tag 32 at any number of levels and the RFID tag can be to the transmission line 28 in accordance with the present invention. For example, FIG. 9 illustrates an alternate method of attaching the RFID tag 32 to the twisted wire pair forming the transmission line 28. A squeeze-on connector 58, such as the type used to connect trailer electrical connections in an automobile, is used to provide a quick and convenient connection between leads 54 connected to RFID tag 32 and twisted wire pair 56.

Figure 10:
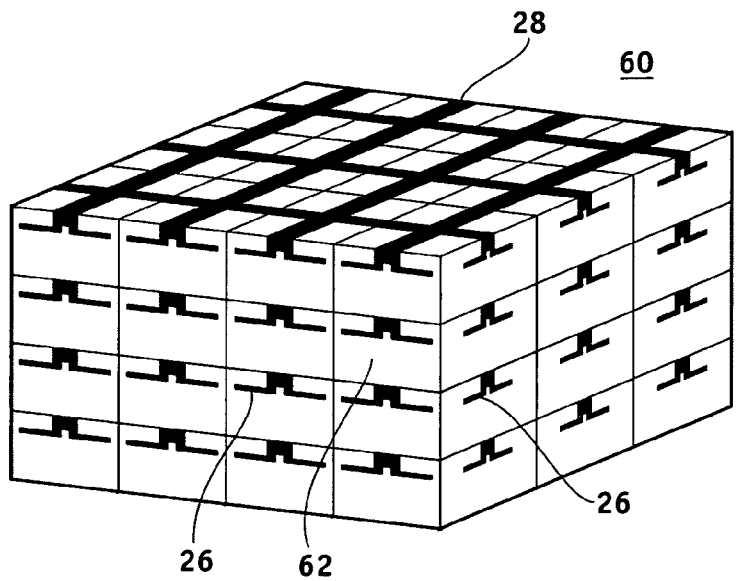
FIG. 10 is an illustration of a stack of objects having the RFID relay device in accordance with an exemplary embodiment of the present invention.

As can be appreciated by the foregoing descriptions, any number of antenna arrangements is available in accordance with the present invention. For example, FIG. 10 shows an arrangement of containers 62 having antennas 26 on all four sidewalls and transmission lines 28 interconnecting the antennas on all four sidewalls to other antennas (not shown) in the interior of the stack. Signals received by the one of the antennas 26 located at the outer periphery of the containers can be relayed with other antennas (not shown) in the interior of the stack of containers (e.g., a stack of containers on a cargo pallet or in a cargo storage area). Conversely, interrogation of the packages within the stack 60 can be made either from the forward facing or side facing walls thereof in a similar manner.

Figure 11:
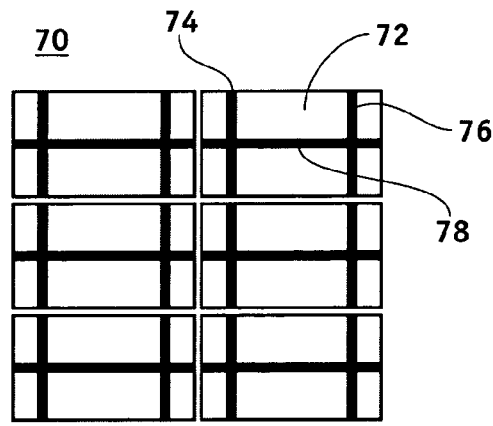
FIG. 11 illustrates a stack of objects having a RFID relay device in accordance with another exemplary embodiment of the present invention.
Figure 12:
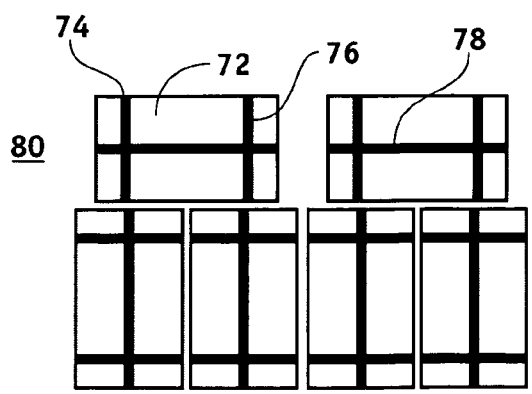
FIG. 12 is a diagram illustrating an alternate arrangement for objects having the RFID relay device of FIG. 11.
Figure 13:
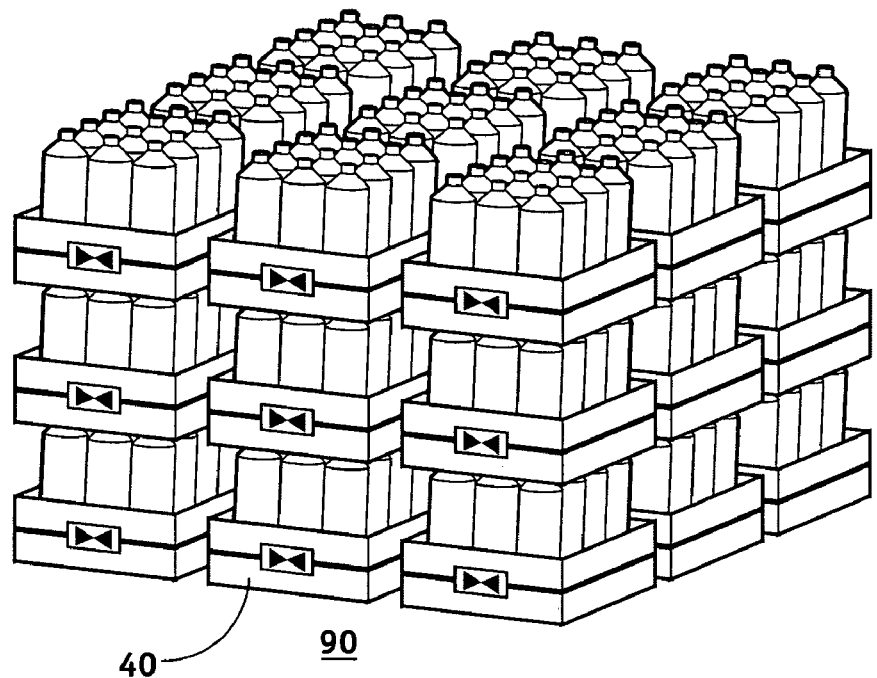
FIG. 13 is another illustration showing an arrangement of objects having the RFID relay device in according to the present invention.

FIG. 11 and FIG. 12 illustrate other arrangements 70 of containers 72 that include one relay conductive structure 78 extending horizontally around the container and a pair of RFID relay devices (74,76) extending around the top, bottom and side walls of the container. The containers can be stacked in a symmetrical arrangement as shown in FIG. 11 or in an alternate overlapping stacking arrangement 80 as shown in FIG. 12. However, other arrangements of the container, one or more relay structures and non-symmetrical arrangements can be provided in accordance with the present invention, such as the arrangement of beverage containers 40 having beverage bottles arranged in a stack 90 as shown in FIG. 13.

In connection with development of specific packaging in accordance with the present invention, it was discovered that the input impedance of some RFID tags in the form of straps, such as RFID tags available from Alien, have an impedance that varies with signal length (e.g., an impedance of about three hundred and thirty ohms (330 Ω) exists when the input signal level is below about negative five decibels (−5 db) and as the signal level exceeds about positive ten decibels (+10 db), the impedance decreases to less than fifty ohms (50 Ω)). The effect of this impedance change on reading RFID tags on containers arranged in a stack and having the RFID relay device of the present invention for coupling RFID signals to RFID tags on containers deep within the stack is two-fold. First, higher power signals lower the impedance of the RFID tag in the first container of the stack, causing an excess of signal to be coupled into that RFID tag, which reduces the signal level for coupling to other containers. Second, the tags deeper within the stack are only weakly coupled to the transmission line because of the lower signal power level and hence higher impedance, and therefore can receive an insufficient interrogation signal. This limits the depth of signal penetration into the stack.

Figure 14:
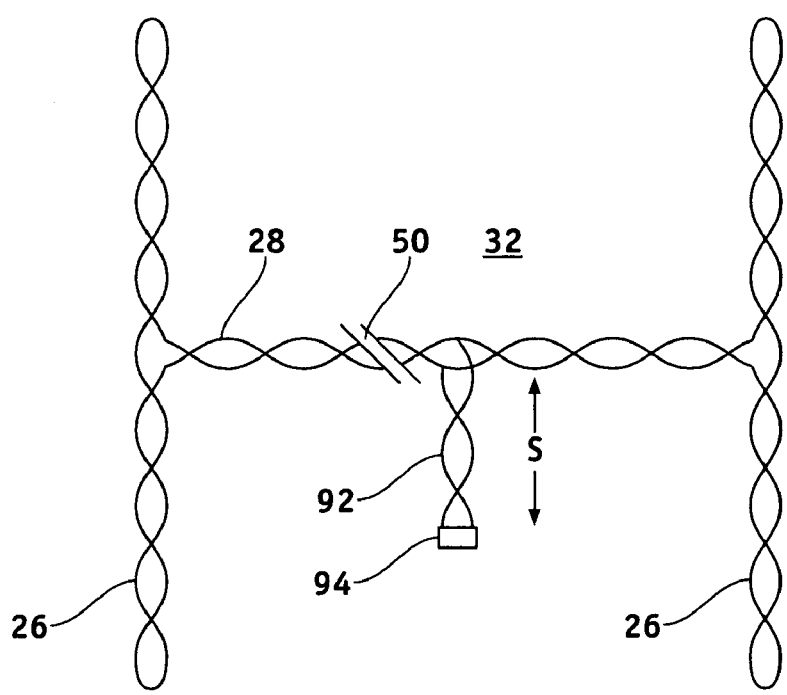
FIG. 14 is an illustration of a RFID relay device according to yet another exemplary embodiment of the present invention.

Using this discovery, an approach has been developed that causes the RFID tags to produce opposite impedance variation characteristics. Referring to FIG. 14, an RFID tag 94 is connected to transmission line 28 by an impedance adjusting circuit comprising matching transmission line 92, which is selected to have a length to present a first impedance level to the transmission line 28 for a first signal power lever and present a second impedance level that is less than the first impedance level to the transmission line for a second signal power level that is less than the first signal power level. As can be appreciated by those of ordinary skill in the art, this can be accomplished using any number of techniques and devices or combinations of techniques and devices.

For example, matching transmission line 92 can have a length (e.g., about one quarter (¼) wavelength) that inverts the impedance of the RFID tag 94 as presented at the junction with transmission line 28. For example, a RFID tag coupled with matching transmission line 92 can be configured to have an impedance of about fifty ohms (50 Ω) at high signal level and an impedance of about two hundred ohms (200 Ω) at the about one hundred ohm (100 Ω) transmission line 28 resulting in a weaker coupling of the strong signal to the RFID tag. If the same RFID tag has an impedance of about three hundred and thirty ohms (330 Ω) at low signal level, with the matching transmission line 92 the RFID tag presents an impedance of about thirty and three tenths ohms (30.3 Ω) at about the one hundred ohm (100 Ω) transmission line 28, resulting in stronger coupling of the weak signal to the RFID tag. The higher impedance for a strong signal causes de-coupling action and a smaller portion of the signal is coupled to the tag, allowing a higher magnitude signal for tags further down the range in the stack. The lower impedance presented for weaker signals allows greater signal strength to be coupled to the tag for detection. The maximum signal coupling occurs if the RFID tag 94 and impedance adjusting circuit 92 present an impedance of about fifty ohms (50 Ω) to the transmission line 92 for weak signals. A matching transmission line 92 having an impedance of about one hundred and twenty eight and five tenths ohms (128.5 Ω) would cause the impedance presented to the transmission line 28 to be about fifty ohms (50 Ω) for a low signal level and about three hundred and thirty ohms (330 Ω) ohms for a high signal level.

While there have been described what are believed to be the preferred embodiments of the present invention, those skilled in the art will recognize that other and further changes may be made thereto without departing from the spirit of the invention, and it is intended to claim all such changes and modifications as fall within the true scope of the invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A relay device for a Radio Frequency IDentification (RFID) transponder, comprising:
   a first antenna configured to receive RFID signals;
   a second antenna configured to receive said RFID signals from said first antenna;
   a transmission line coupling said first antenna and said second antenna; and
   an impedance adjusting circuit coupled to said transmission line and configured for coupling to the RFID transponder.

2. The relay device for the RFID transponder claim 1, wherein the RFID device is attached to a container.

3. The relay device for the RFID transponder of claim 2, wherein said container is formed of folded fiberboard parts.

4. The relay device for the RFID transponder of claim 2, wherein said container is a pallet.

5. The relay device for the RFID transponder of claim 2, wherein said first antenna is positioned at a first location on said container and said second antenna is positioned at a second location on said container other than said first location.

6. The relay device for the RFID transponder of claim 2, wherein said container comprises:
   a first wall;
   a second wall; and
   a rib interconnecting said first wall and said second wall.

7. The relay device for the RFID transponder of claim 6, wherein said transmission line is interposed between said first wall and said second wall.

8. The relay device for the RFID transponder of claim 1, further comprising a third antenna coupled to said transmission line.

9. The relay device for the RFID transponder of claim 1, further comprising a second transmission line coupling a third antenna and a fourth antenna.

10. The relay device for the RFID transponder of claim 1, wherein at least one of said first antenna and said second antenna is a dipole antenna.

11. The relay device for the RFID transponder of claim 1, wherein at least one of said first antenna and said second antenna is a loop antenna.

12. The relay device for the RFID transponder of claim 1, wherein at least one of said first antenna and said second antenna is a spiral antenna.

13. The relay device for the RFID transponder of claim 1, wherein said transmission line is a common resonant structure that is also configured to form at least one of said first antenna and said second antenna.

14. The relay device for the RFID transponder of claim 1, wherein said first antenna, said second antenna, and said transmission line are fonned at least partially from a pair of twisted wires.

15. The relay device for the RFID transponder of claim 1, wherein a length of said transmission line is adjustable.

16. The relay device for the RFID transponder of claim 1, further comprising a tuning circuit coupling said impedance adjusting circuit mid said transmission line.

17. The relay device for the RFID transponder of claim 16, wherein said tuning circuit is a pair of twisted wires.

18. The relay device for the RFID transponder of claim 1, further comprising a squeeze-on connector configured to couple said impedance adjusting circuit and said transmission line.

19. The RFID object having the RFID transponder of claim 1, wherein the RFID object is attached to an object.

20. The relay device for the RFID transponder of claim 1 wherein said first antenna, said second antenna and said transmission line are parts of an integral conductive structure, and wherein said transmission line carries said RFID signals from said first antenna to said second antenna.

21. The relay device for the RFID transponder of claim 20 wherein transmission line directly connects said antennas.

22. A relay device for a Radio Frequency IDentification (RFID) transponder, comprising:
   a first antenna;
   a second antenna;
   a transmission line coupling said first antenna and said second antenna; and
   an impedance adjusting circuit coupled to said transmission line and configured for coupling to the RFID transponder, wherein said impedance adjusting circuit is configured to provide a first impedance with said transmission line for a first input signal power and a second impedance with said transmission line for second input signal power.

23. The RFID container having the RFID tag of claim 22, wherein said first impedance is greater than said second impedance and said first input signal power is greater than said second input signal power.

24. A Radio Frequency Idendification (RFID) object having an RFID transponder, comprising:
   a first antenna at a first location of the RFID object, said first antenna configured to receive RFID signals;
   a second antenna at a second location of the RFID object other than said first location, said second antenna configured to receive said RFID signals from said first antenna;
   a transmission line coupling said first antenna and said second antenna; and
   an impedance adjusting circuit coupling the RFID transponder and said transmission media.

25. The RFID object having the RFID transponder of claim 24, wherein said object is formed of folded fiberboard parts.

26. The RFID object having the RFID transponder of claim 24, wherein said object is a pallet.

27. The RFID object having the RFID transponder of claim 24, further comprising a third antenna located at a third location other than said first location and said second location.

28. The RFID object having the RFID transponder of claim 27, wherein said third antenna is coupled to said transmission line.

29. The RFID object having the RFID transponder of claim 24, further comprising a fourth antenna located at a fourth location other than said first location, said second location, and said third location.

30. The RFID object having the RFID transponder of claim 29, further comprising a second transmission line coupling a third antenna and a fourth antenna.

31. The RFID object having the RFID transponder of claim 24, wherein at least one of said first antenna and said second antenna is a dipole antenna.

32. The RFID object having the RFID transponder of claim 24, wherein at least one of said first antenna and said second antenna is a loop antenna.

33. The RFID abject having the RFID transponder of claim 24, wherein at least one of said first antenna and said second antenna is a spiral antenna.

34. The RFID object having the RFID transponder of claim 24, wherein said transmission line is a common resonant structure that is also configured to form at least one of said first antenna and said second antenna.

35. The RFID object having the RFID transponder of claim 24, wherein said container comprises:
    a first wall;
    a second wall; and
    a rib interconnecting said first wall and said second wall.

36. The RFID object having the RFID transponder of claim 24, wherein said transmission line is interposed between said first wall and said second wall.

37. The RFID object having the RFID transponder of claim 24, wherein said first antenna, said second antenna, and said transmission line are formed at least partially from a pair of twisted wires.

38. The RFID object having the RFID transponder of claim 24, wherein a length of said transmission line is adjustable.

39. The RFID object having the RFID transponder of claim 24, further comprising a tuning circuit coupling said impedance adjusting circuit and said transmission line.

40. The RFID object having the RFID transponder of claim 39, wherein said tuning circuit is a pair of twisted wires.

41. The RFID object having the RFID transponder of claim 24, further comprising a squeeze-on connector configured to couple said impedance adjusting circuit and said transmission line.

42. The RFID object having the RFID transponder of claim 24 wherein said first antenna, said second antenna and said transmission line are parts of an integral conductive structure printed on said RFID object, and wherein said transmission line carries said RFID signals from said first antenna to said second antenna.

43. The RFID object having the RFID transponder of claim 42 wherein transmission line directly connects said antennas.

44. A Radio Frequency Idendification (RFID) object having an RFID transponder, comprising:
    a first antenna at a first location of the RFID object;
    a second antenna at a second location of the RFID object other than said first location;
    a transmission line coupling said first antenna and said second antenna; and
    an impedance adjusting circuit coupling the RFID transponder and said transmission media, wherein said impedance adjusting circuit is configured to provide a first impedance with said transmission line for a first input signal power and a second impedance with said transmission line for second input signal power.

45. The RFID object having the RFID transponder of claim 44, wherein said first impedance is greater than said second impedance and said first input signal power is greater than said second input signal power.

46. A method of relaying a Radio Frequency Identification (RFID) signal, comprising the steps of:
    receiving the RFID signal at a first antenna;
    transmitting the RFID signal from said first antenna to a second antenna;
    exhibiting a first impedance during said transmitting the RFID signal from said first antenna to said second antenna if said RFID signal has a first power; and
    exhibiting a second impedance during said transmitting the RFID signal from said first antenna to said second antenna if RFID signal has a second power other than said first power.

47. The method of relaying the RFID signal of claim 46, wherein said first impedance is greater than said second impedance.

48. The method of relaying the RFID signal of claim 46, wherein said first power is greater than said second power.

49. The method of relaying the RFID signal of claim 46, wherein the RFID signal is a RFID interrogation signal.

50. A RFID container having a RFID transponder, comprising:
    a plurality of container sides configured to at least partially surround content of the RFID container;
    a first antenna associated with a first container side of said plurality of container sides;
    a second antenna associated with a second container side of said plurality of container sides;
    a transmission line coupling said first antenna and said second antenna; and
    a matching circuit coupling said RFID transponder and said transmission line, said matching circuit and said RFID transponder being arranged to present a first higher impedance to said transmission line for high signal power levels and a second lower impedance to said transmission for low signal power levels.

* * * * *

UNITED STATES PATENT AND TRADEMARK OFFICE
CERTIFICATE OF CORRECTION

PATENT NO. : 7,075,437 B2  Page 1 of 1
APPLICATION NO. : 10/803191
DATED : July 11, 2006
INVENTOR(S) : Raj Bridgelall et al.

It is certified that error appears in the above-identified patent and that said Letters Patent is hereby corrected as shown below:

In column 7, line 12, insert --of-- after "transponder" and before "claim";
In column 7, line 53, replace "fonned" with --formed--;
In column 7, line 59, replace "mid" with --and--; and
In column 8, line 63, replace "abject" with --object--.

Signed and Sealed this

Twenty-seventh Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 7,075,437 B2 Page 1 of 1
APPLICATION NO. : 10/803191
DATED : July 11, 2006
INVENTOR(S) : Raj Bridgelall et al.

It is certified that error appears in the above-identified patent and that said Letters Patent is hereby corrected as shown below:

Item (54) in the Title, please delete "AND RFID" and replace with --AN RFID-- so that the title reads: RFID RELAY DEVICE AND METHODS FOR RELAYING AN RFID SIGNAL.

In claim 24, column 8, line 36, please delete "media" and replace with --line--.

In claim 29, column 8, line 51, please delete "24" and replace with --28--.

In claim 44, column 9, line 45, please delete "media" and replace with --line--.

In claim 50, column 10, line 43, please delete "transmission" and replace with --transmission line--.

Signed and Sealed this

Twenty-ninth Day of January, 2008

JON W. DUDAS
*Director of the United States Patent and Trademark Office*